W. H. GRIFFITH.
Cultivators.
No. 129,730.  Patented July 23, 1872.
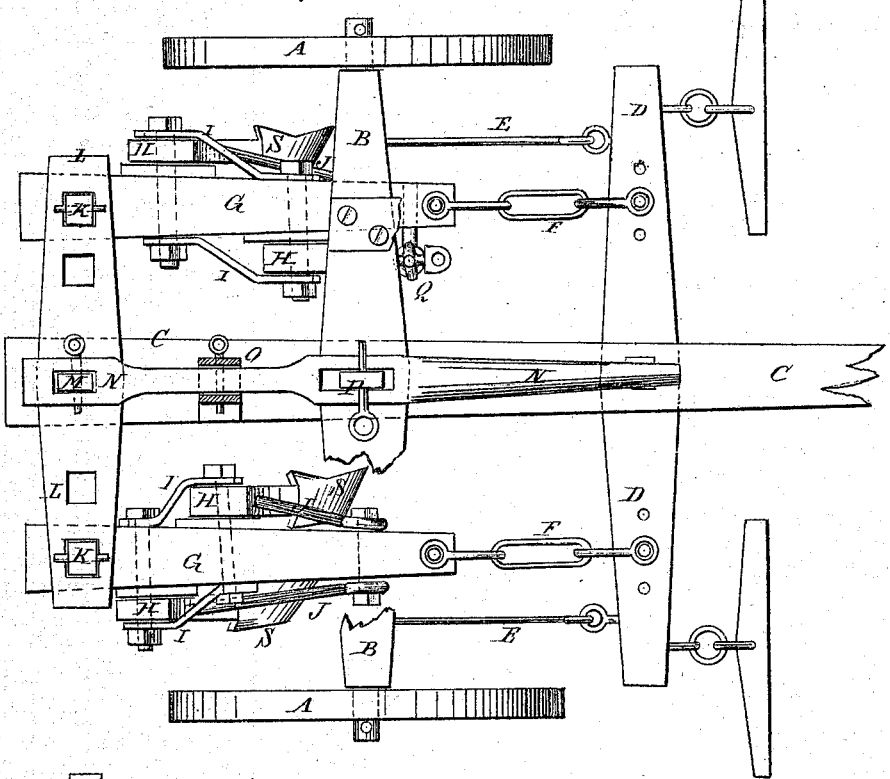
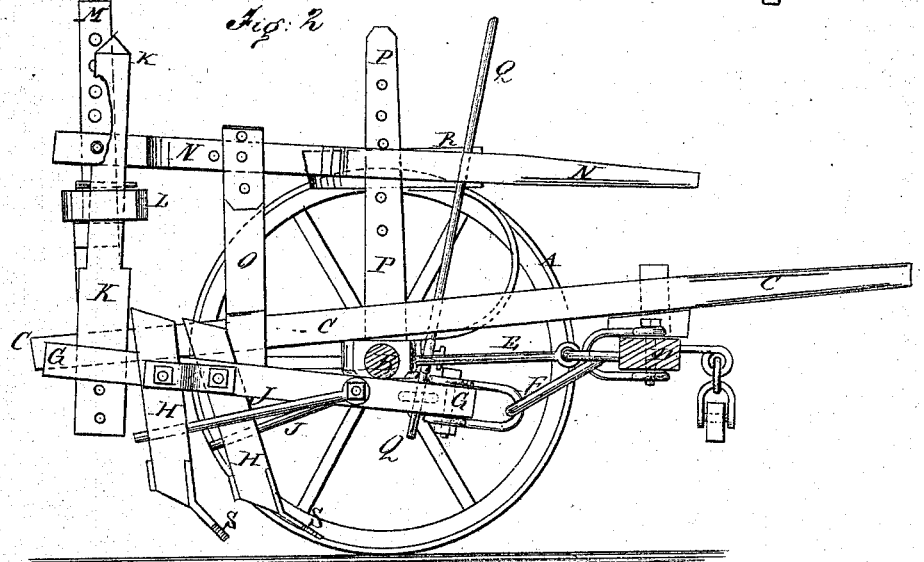

UNITED STATES PATENT OFFICE.

WILLIAM H. GRIFFITH, OF LOCKHART, TEXAS, ASSIGNOR TO HIMSELF AND STOKES MINCENHOMMER, OF SAME PLACE.

IMPROVEMENT IN CULTIVATORS.

Specification forming part of Letters Patent No. 129,730, dated July 23, 1872.

Specification describing a new and useful Improvement in Cultivators, invented by WILLIAM H. GRIFFITH, of Lockhart, in the county of Caldwell and State of Texas.

Figure 1 is a top view of my improved cultivator, parts being broken away to show the construction. Fig. 2 is a side view of the same, parts being broken away to show the construction.

My invention has for its object to furnish an improved cultivator, simple in construction, effective in operation, strong and durable, and which may be readily adjusted for cultivating plants, covering small grain, and breaking up the ground; and it consists in the construction and combination of various parts of the cultivator, as hereinafter more fully described.

A are the wheels, which work upon the journals of the axle B. C is the tongue, which is attached to the middle part of the axle B, and to which is bolted the center of the double-tree D. The end parts of the double-tree D are connected with the axle B by rods or chains E, as shown in Figs. 1 and 2, so that the machine may be drawn forward squarely. F are the clevises and links or chains, by which the forward ends of the plow-beams G are connected with the double-tree D, several holes being formed in the said double-tree to receive the clevis-pins or bolts, so that the plows can be readily adjusted wider apart or closer together, as may be required. To the opposite sides of the rear part of the plow-beams G are attached the upper ends of the plow-standards H, blocks being interposed between the said beams and standards to bring the plows to the proper distance apart. The plow-standards H are kept from twisting by braces I, and the draft-strain upon them is sustained by the draft-rods J, the rear ends of which are attached to the said standards, and the forward ends of which are secured to the opposite sides of the plow-beams G by a bolt which passes through the said plow-beams. In the rear end of each of the plow-beams G is formed a slot or mortise to receive the long tenon formed upon the lower end of the upright K. Several holes are formed in the tenons formed upon the lower ends of the uprights K to receive the pin or bolt by which they are secured to the plow-beams, so that the said uprights may be conveniently raised and lowered, as may be desired. Upon the upper ends of the uprights K are formed long tenons, which pass through holes in the end parts of the cross-bar L, and have several holes formed through them, to receive the pins or bolts that pass through them above the said bar L, so that the said uprights K, and with them the plows, may be raised by raising the said bar L, and so that the height to which the plows may be raised may be adjusted at will. Several holes are formed in the cross-bar L to receive the upper tenons of the uprights K, so that the plows may be adjusted wider apart or closer together, as may be desired. M is an upright, the lower end of which, or a long tenon formed upon its lower end, works freely in a guide-slot formed in the projecting rear end of the tongue C. Upon the upper end of the upright M is formed a long tenon, which passes up through a hole in the center of the bar L and through a hole in the rear end of the lever N, to which it is secured by a pin or bolt, several holes being formed in the said tenon to receive the said pin or bolt, so that it may be adjusted as required. The cross-bar L rests upon the shoulder of the upright M, so that, by raising the said upright by means of the lever N, the plows may be raised from the ground. The lever N is pivoted to a standard, O, the lower end of which is attached to the tongue C, several holes being formed in the said standard to receive the said pivoting-pin, so that the pivoting-point of the lever may be raised or lowered, as may be desired. P is a standard, the lower end of which is secured to the tongue C, and which passes up through a slot in the lever N, and has several holes formed through it to receive a pin, by which the lever N may be secured in any position into which it may be adjusted. Q is a lever, which is pivoted to the axle B, and the lower end of which passes through an eyebolt or keeper attached to the side of one of the plow-beams G. The upper end of the lever Q projects into such a position that it may be conveniently reached and operated by the plowman from his seat to guide the plows in plowing crooked rows. R is the seat, which is attached to the axle B. S are the plows, the lower parts of which are inclined forward, as shown in Fig. 2, so as to run nearly level in the ground, and are made with inclined forward or cutting edges, as shown in Fig. 1, so as to cut off roots, &c.

The parts of the plows S that are attached to the standards may be inclined to throw the soil in either direction.

Shovel-plows or plows of any other kind may be used, as desired, or as the character of the work to be done may require.

The machine may be used for breaking up land by taking off the two outer plow-standards and plows.

Having thus described my invention, I claim as new and desire to secure by Letters Patent—

The combination of the three adjustable uprights K M K, cross-bar L, adjustable lever N, and standards O P with each other and with the plow-beams G, tongue C, and axle B, substantially as herein shown and described, and for the purpose set forth.

WM. H. GRIFFITH.

Witnesses:
   ABEL BAKER,
   W. W. BAKER.